US012208059B2

(12) United States Patent
Carteaux et al.

(10) Patent No.: US 12,208,059 B2
(45) Date of Patent: Jan. 28, 2025

(54) DEVICE FOR SELECTIVE REGIONALIZATION OF PULMONARY AERATION TO THE POSTEROLATERAL PART OF THE LUNGS

(71) Applicants: INSERM (INSTITUT NATIONAL DE LA SANTÉ ET DE LA RECHERCHE MÉDICALE), Paris (FR); ASSISTANCE PUBLIQUE —HÔPITAUX DE PARIS, Paris (FR); UNIVERSITE PARIS-EST CRETEIL VAL DE MARNE, Creteil (FR)

(72) Inventors: Guillaume Carteaux, Montreuil (FR); Armand Mekontso Dessap, Paris (FR)

(73) Assignees: INSERM (INSTITUT NATIONAL DE LA SANTE ET DE LA RECHERCHE MEDICALE), Paris (FR); ASSISTANCE PUBLIQUE—HÔPITAUX DE PARIS, Paris (FR); UNIVERSITE PARIS-EST CRETEIL VAL DE MARNE, Creteil (FR)

( * ) Notice: Subject to any disclaimer, the term of this patent is extended or adjusted under 35 U.S.C. 154(b) by 597 days.

(21) Appl. No.: 17/435,443

(22) PCT Filed: Mar. 3, 2020

(86) PCT No.: PCT/FR2020/050421
§ 371 (c)(1),
(2) Date: Sep. 1, 2021

(87) PCT Pub. No.: WO2020/178521
PCT Pub. Date: Sep. 10, 2020

(65) Prior Publication Data
US 2022/0054354 A1 Feb. 24, 2022

(30) Foreign Application Priority Data
Mar. 4, 2019 (FR) ...................................... 1902190

(51) Int. Cl.
*A61H 31/02* (2006.01)
*A61H 31/00* (2006.01)

(52) U.S. Cl.
CPC ....... *A61H 31/02* (2013.01); *A61H 2031/001* (2013.01); *A61H 2201/1619* (2013.01);
(Continued)

(58) Field of Classification Search
CPC .............. A61H 31/02; A61H 2031/025; A61H 31/008; A61H 31/006; A61H 31/00; A61H 9/0057
See application file for complete search history.

(56) References Cited

U.S. PATENT DOCUMENTS 2,648,331 A * 8/1953 Bennett .................. A61H 31/02 92/37
2,707,948 A 5/1955 Emerson
(Continued)

FOREIGN PATENT DOCUMENTS

GB 470611 8/1937

OTHER PUBLICATIONS

Written Opinion in International Application No. PCT/FR2020/050421, Aug. 21, 2020, pp. 1-7.

*Primary Examiner* — Joseph D. Boecker
*Assistant Examiner* — Thomas W Greig
(74) *Attorney, Agent, or Firm* — SALIWANCHIK, LLOYD & EISENSCHENK

(57) ABSTRACT

The invention relates to a device (10) for selective regionalization of pulmonary aeration, intended to apply a vacuum over a posterolateral part of a patient's chest wall, said
(Continued)

device comprising a rigid or semi-rigid shell (11) intended to selectively surround a posterior part of the patient's chest wall, and a layer of honeycomb material (12) covering an internal wall (13) of the rigid shell, intended to be in contact with the patient's chest wall, said shell comprising at least one through hole (14), intended to be connected to a negative pressure generator.

18 Claims, 3 Drawing Sheets

(52) U.S. Cl.
CPC .. *A61H 2201/165* (2013.01); *A61H 2201/169* (2013.01); *A61H 2205/084* (2013.01)

(56) References Cited

U.S. PATENT DOCUMENTS

| | | | | |
|---|---|---|---|---|
| 2,853,998 | A | 9/1958 | Emerson | |
| 2017/0020768 | A1* | 1/2017 | Palmer | A61H 31/02 |
| 2017/0087054 | A1* | 3/2017 | Antros | A61H 31/02 |
| 2019/0159964 | A1* | 5/2019 | Chen | A61H 1/00 |

* cited by examiner

[Fig.1]
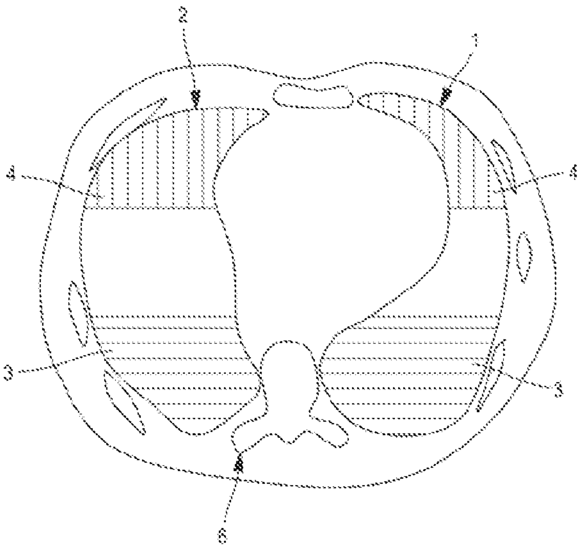
[Fig.2A]
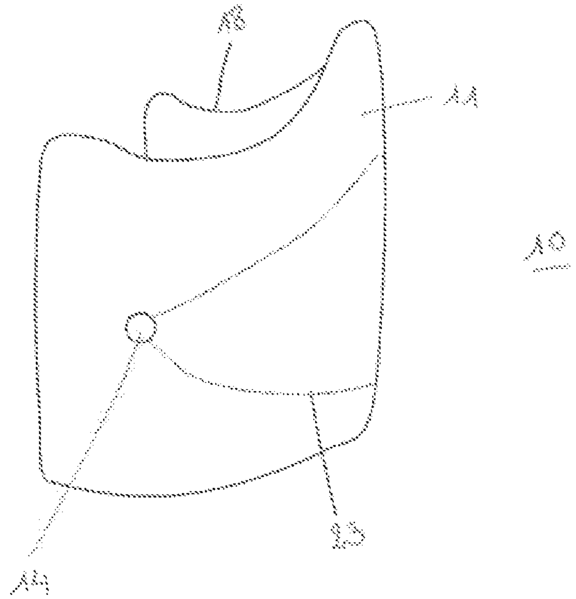

[Fig.2B]
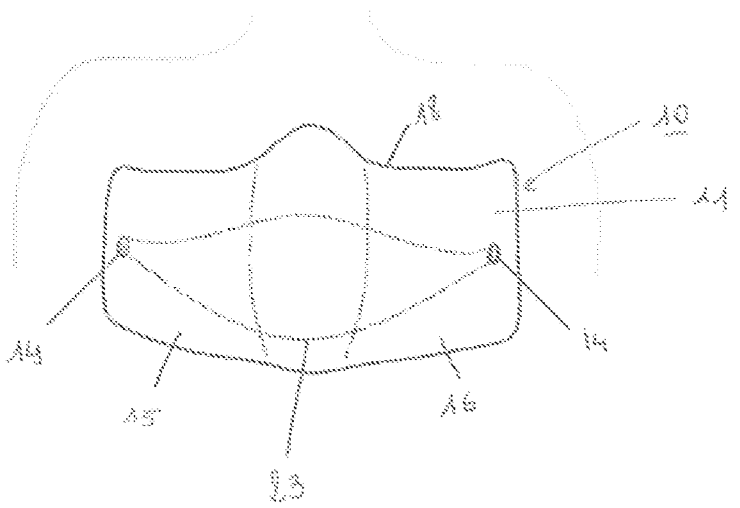
[Fig.3]
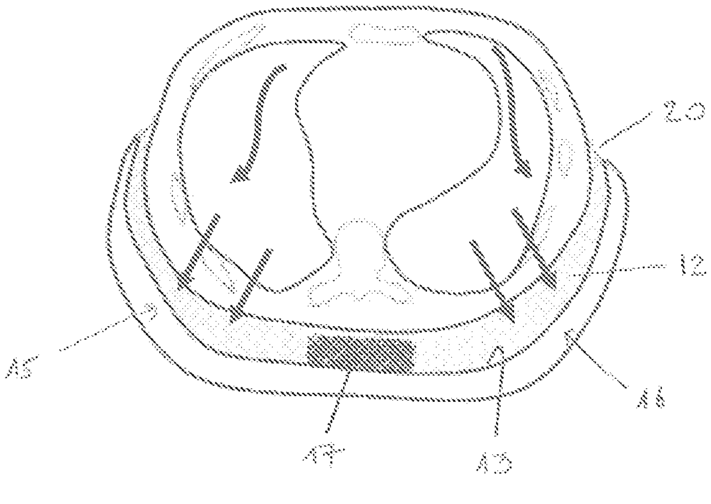

[Fig.4]
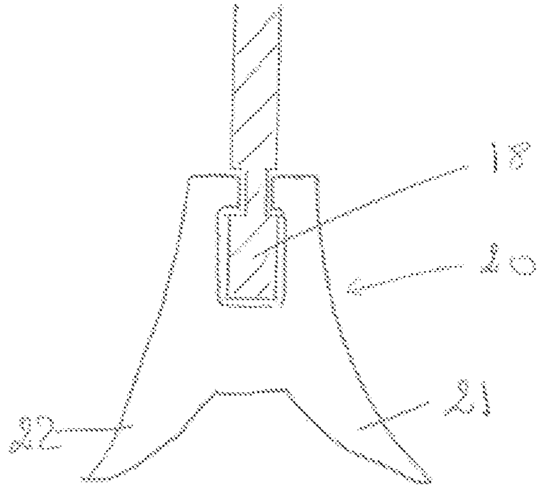

DEVICE FOR SELECTIVE REGIONALIZATION OF PULMONARY AERATION TO THE POSTEROLATERAL PART OF THE LUNGS

CROSS-REFERENCE TO RELATED APPLICATION

This application is the U.S. national stage application of International Patent Application No. PCT/FR2020/050421, filed Mar. 3, 2020.

TECHNICAL FIELD

The invention relates to a device for selective regionalization of pulmonary aeration, intended to selectively surround the posterior part of a patient's thoracic cage, to create a vacuum therein by means of a negative pressure generator. The invention finds applications in the medical field, and especially in the field of ventilatory support for patients presenting with a respiratory pathology associated with inhomogeneous pulmonary lesions. The invention is particularly suited for the treatment or prevention of acute or chronic respiratory failure.

Technological Background

Acute or chronic respiratory failure is a condition affecting several million people worldwide. In some cases, the inability of the respiratory system to ensure sufficient oxygenation of the body must be supplemented by ventilatory support.

Current devices for managing acute or chronic respiratory failure deliver gas globally throughout the patient's pulmonary volume. For example, ventilatory support by intrathoracic positive pressure is delivered by an invasive interface (intubation tube or tracheostomy cannula) or non-invasive interface (nasal or facial mask, helmet), connected to a positive pressure generator. Alternatively, ventilatory support by extrathoracic negative pressure is delivered globally via a shell or cuirass (placed on the front part of the torso), a cage or a sealed article of clothing (containing in particular the entire torso), connected to a negative pressure generator.

Yet many respiratory pathologies are accompanied by inhomogeneous pulmonary involvement. For example, in the case of postoperative atelectasis, acute respiratory distress syndrome (ARDS) or acute chest syndrome in adults with sickle cell anemia, the pulmonary lesions have a clear posterolateral predominance. Global delivery of ventilation then entails the risk of non-recruiting the damaged areas and overdistending healthy areas, which could induce or worsen lesions caused by ventilatory support (ventilator-induced lung injury, or VILI). These lesions are responsible for excess mortality in patients on artificial ventilation.

There are currently no devices that limit the risk of non-recruitment of damaged areas and overdistension of healthy areas.

SUMMARY OF THE INVENTION

The present invention makes it possible to redistribute more homogeneously the ventilation delivered by ventilatory support and/or naturally by the respiratory muscles, so as to preferentially solicit the damaged areas, rather than the healthy areas of the lung or lungs in a patient presenting with respiratory failure most often requiring ventilatory support, in the event of inability of their respiratory muscles to ensure sufficient lung ventilation.

The invention aims to at least partially resolve the problem associated with overventilation of the healthy areas to the detriment of the damaged areas in one lung or both lungs of a patient needing artificial respiratory support. For this, the invention proposes a device allowing selective regionalization of the distribution of pulmonary aeration, so as to preferentially recruit the damaged areas of a lung during ventilatory support or during spontaneous ventilation. Generally, the damaged areas of a lung are most often located in the posterolateral part. Thus, the invention proposes locally creating a vacuum that would promote the opening and aeration of the damaged posterolateral areas of the lung to make them available to the ventilation delivered by ventilatory support (by positive pressure) and/or naturally by the respiratory muscles. To do so, the device according to the invention comes to selectively surround the dorsal part of the patient's thoracic cage, in a hermetic manner. The space between the patient's body and the device is advantageously filled by a material able to follow the contour of the patient's body and make it possible, like a spacer, to keep a distance between the negative pressure orifice and the skin of the dorsal wall (in order to avoid a contact point between the skin of the dorsal wall and the shell at the negative pressure orifice which would generate a vacuum that is too focal and too strong at this point of contact). A vacuum is created in this space and in the posterolateral part of the patient's lungs. The device according to the invention is non-invasive and can be used in the hospital and non-hospital environment. Advantageously, the device is molded to the patient's dimensions so as to ensure an optimum sealing. The device according to the invention can be used alone or in combination with an invasive or non-invasive conventional ventilatory support system.

The invention therefore relates to a device for selective regionalization of pulmonary aeration, intended to apply a vacuum over a posterolateral part of a patient's chest wall, said device comprising a rigid or semirigid shell intended to selectively surround a posterior part of the patient's chest wall, and a layer of honeycomb material covering an internal wall of the rigid shell, intended to be in contact with the patient's chest wall, said shell comprising at least one through hole, intended to be connected to a negative pressure generator.

In other words, the invention concerns a device for selective regionalization of pulmonary ventilation, intended to apply a vacuum over a posterolateral part of a patient's chest wall, said device comprising a rigid or semirigid shell intended to surround a posterior part of the patient's chest wall, and a layer of honeycomb material covering an internal wall of the rigid shell, intended to be in contact with the patient's chest wall, said shell comprising at least one through hole, intended to be connected to a negative pressure generator.

The invention also relates to a system for applying a localized transpulmonary pressure, said system comprising at least one device for selective regionalization of pulmonary aeration according to the invention, at least one negative pressure generator connected to the device by the through hole in the shell, so as to communicate a negative pressure from the generator to the shell and create a vacuum between the patient's posterior chest wall on which the device is applied and said shell.

The invention also relates to a ventilatory support kit comprising a system for applying a localized transpulmonary pressure according to the invention and a system for invasive or non-invasive artificial ventilation (working by positive pressure).

Advantageously, the negative pressure generator is able to deliver constant or variable negative pressures.

Advantageously, an invasive or non-invasive artificial ventilation system is connected with the negative pressure generator(s).

Advantageously, the invasive or non-invasive artificial ventilation system is able to deliver constant or variable positive pressures.

DESCRIPTION OF THE DRAWINGS

FIG. 1 schematically shows a cross section of the thoracic cage of a patient presenting with inhomogeneous lesions, with condensation of the posterolateral part of the right and left lungs.

FIG. 2 schematically shows a side view (A) and top view (B) of a device for selective regionalization of pulmonary aeration according to one example of embodiment of the invention.

FIG. 3 shows a cross section of a device for selective regionalization of pulmonary aeration according to one example of the invention, in position around the dorsal part of the patient's thoracic cage, a selective increase of transpulmonary pressure in the posterolateral areas being represented by the arrows (the pulmonary aeration arising from artificial or spontaneous ventilation is thus better distributed in the posterolateral areas of both lungs).

FIG. 4 shows an example of a sealing gasket that can be used with the device for selective regionalization of pulmonary aeration according to the invention.

DETAILED DESCRIPTION OF THE INVENTION

The present invention proposes a device intended to selectively surround the posterior (dorsal) part of a patient's thoracic cage that can apply a vacuum over all or part of the posterior part of said thoracic cage. In the context of the invention, the term "patient" designates a mammal, and preferably a human, including an adult, a child or an infant. The term "patient" can also designate a non-human animal, in particular a non-human primate.

The device according to the invention comprises a shell of rigid or semirigid material, forming the structure that will receive the patient's body. The shell is, for example, made of plastic such as polypropylene, polyethylene or polyamide, of composite material such as fiberglass, carbon or aramid, or of resin. It can be modeled, for example, by thermoforming or three-dimensional printing. According to the invention, the shell preferentially has an elliptical shape exhibiting a concave curvature to follow the contour of the posterior part of the patient's chest wall. Advantageously, the dimensions of the shell are such that the shell covers the posterior and lateral part of the torso, from the inferior costal edge at the bottom to the interscapular region at the top at the height of the axillary hollows, and transversely from one mid axillary line to the other.

Advantageously, the shell is obtained by molding, taking the patient's dimensions into account. For example, the shell is obtained by means of a 3D printing scan. Of course, it is possible to create a shell with so-called "standard" dimensions intended to be used for several patients having a morphology that is similar overall. For example, it is possible to provide different shell dimensions (wide, medium, narrow, etc.) suited to different patient categories.

The general shape of the shell is such that it hermetically follows the contour of the dorsal part of the patient's chest wall, when the patient is lying on said shell. Advantageously, the shape of the shell is such that it can receive the dorsal part of the patient's torso, from the inferior costal margin at the bottom to the interscapular region at the height of the axillary hollows at the top, and transversely from one mid axillary line to the other on the sides. The shell thus defines a volume intended to receive a dorsal and lateral part of a patient's thoracic cage.

A layer of honeycomb (or porous) material lines the internal wall of the shell, directed toward the patient's body. The dorsolateral part of the patient's body is therefore in contact with the honeycomb material layer. According to the invention, the honeycomb material layer has a structure that, when a vacuum is created in the shell, allows homogeneously distributing the vacuum over the entire contact surface of the dorsal part of the patient's chest wall. In one embodiment, the honeycomb material layer is made of polymer, preferably chosen from among polyurethane, polyethylene or polyether. The honeycomb or cellular material layer is, for example, a homogenization foam, preferably with open porosity, thus allowing the pores of the foam to be connected to each other and distribute the vacuum homogenously. Preferentially, the foam used has a low density and a low rigidity, especially to follow the contours of the dorsal part of the patient. The foam can especially be a polymeric foam, especially of polypropylene or polystyrene.

In one embodiment, the sealing between the hermetic shell and the patient's body is obtained via sealing means extending over a peripheral part of the shell, intended to be tightly supported against the patient's chest wall. For example, the sealing means comprise a sealing gasket. The connection between the sealing gasket and the shell can also be reinforced by an adhesive. In a particular embodiment, the sealing gasket comprises two sealing lips, intended to come in contact with the patient's skin, on either side of the peripheral part of the shell.

According to the invention, the shell can have one or more reinforcing grooves, extending over the internal and external wall of the shell. Advantageously, the cross section of each groove defines a concavity at the internal wall and a convexity at the external wall. Advantageously, at least one reinforcing groove emerges into a through hole of the shell. Thus, the groove(s) can also serve to aspirate and drain any serosities.

In one embodiment, the device comprises a central support means, extending longitudinally over the internal wall of the shell, and intended to come into contact with the patient's body along the spine. Advantageously, the support means is of a sufficiently dense and/or strong material so as not to be crushed by the patient's weight and to support the patient's spine. For example, the central support means is of a hermetic material, able to hermetically separate the parts of the shell positioned on either side of said central support means when the shell is held around the posterior part of the patient's thoracic cage. Thus, the central support means makes it possible to divide the internal volume of the shell into two parts, wherein it is possible to create the vacuum independently. For example, the support means is of viscoelastic material, especially a viscoelastic gel.

According to a particular embodiment, the device for selective regionalization of the distribution of pulmonary aeration according to the invention comprises a rigid or semirigid hermetic shell, intended to selectively surround a posterior part of the patient's chest wall, a sealing gasket extending over a peripheral part of said shell and intended to be supported in a sealed manner against the patient's chest wall, a central support means extending transversely over the internal wall of the shell and dividing the shell into two parts, each of the two parts of the shell being lined with a layer of honeycomb material, the wall of the shell being traversed at each of these parts by an orifice intended to be connected to a negative pressure generator, so that it is possible to create a vacuum in one and/or the other part of the shell when it is applied onto the posterior part of the patient's thoracic cage.

The invention also concerns a system for applying a localized transpulmonary pressure, said system comprising at least one device for selective regionalization of the distribution of pulmonary aeration described above and at least one negative pressure generator connected to the device by the through hole in the shell, so as to communicate a negative pressure from the generator to the shell and create a vacuum between the patient's posterior chest wall on which the device is applied and said shell.

According to the invention, it is possible to use the device for selective regionalization of the distribution of pulmonary aeration such as described above in combination with an invasive or non-invasive artificial ventilation system (that works by positive pressure).

Thus, the device aims to better distribute the pulmonary aeration resulting from the ventilation delivered by ventilatory support with an invasive or non-invasive artificial ventilation system by positive pressure, and/or naturally by the respiratory muscles, to preferentially distribute aeration in the posterolateral areas of the lungs, by selectively promoting the opening of the alveoli of these usually damaged areas, these latter otherwise remaining (in the known state of the art) occluded to the ventilation generated by an artificial ventilation system and/or naturally by the respiratory muscles.

The invention will be better understood upon reading the description which follows and examining the figures which accompany it.

As explained above, some patients in respiratory failure present with inhomogeneous lung lesions. FIG. 1 shows a cross section of a human patient's thoracic cage, lying on their back (in dorsal decubitus), vertebras 6 toward the bottom of the figure. Posterior parts 3 of the lungs are condensed and poorly aerated (horizontal hatchings) and may undergo opening/closing cycles generating additional pulmonary lesions, while relatively healthy anterior parts 4 (vertical hatchings) are overdistended by global ventilatory support.

Device 10 according to the invention makes it possible to alleviate this problem by targeted promotion of re-aeration of the posterior part of one or both lungs 1, 2 (FIG. 3). More precisely, the dorsal part of the patient's thoracic cage is housed in hermetic shell 11, and rests on a homogenization foam 12 lining an internal wall 13 of said shell 11. A vacuum pump (not shown) is connected to hermetic shell 11 by at least one through hole 14 created in shell 11 (FIGS. 2A and 2B) to create a vacuum able to lower the pleural pressure around posterior part 3 of the lung and thus increase transpulmonary pressure in a localized manner, promoting re-aeration thereof. A pressure sensor can be connected to the vacuum pump to monitor the pressure inside the shell.

The damaged area of the lung can be defined beforehand on the basis of a clinical examination or additional imaging examinations.

FIGS. 2A and 2B schematically show an example of embodiment of a device for selective regionalization of pulmonary aeration 10 towards the posterolateral areas according to the invention. The shell 11 has a general shape and curvature, and is made of rigid or semirigid material, allowing it to follow the contour of the dorsal part of the patient's thoracic cage. Advantageously, shell 11 extends longitudinally from the lower edge of the ribs to the axillary hollow, and transversely up to the midaxillary line. Two through holes 14 are created in the wall of hermetic shell 11, on either side of a central longitudinal axis (extending essentially along the spine of the patient housed in the shell) dividing said shell 11 into two essentially equal lateral parts 15, 16. In one embodiment, such as shown in FIG. 3, a central support means 17 extends longitudinally along inner wall 13 of shell 11, so as to physically separate the two lateral parts 15, 16. Homogenization foam 12 lines each of lateral parts 15, 16 from a peripheral contour 18 to central support means 17. Alternatively, foam 12 can extend over internal wall 13 of shell 12, and central support means 17 covers said foam 12 or is covered by said foam 12. The presence of central support means 17 makes it possible to potentially hermetically divide the internal volume of shell 11 into two parts. Thus, if each part of shell 11 is provided with a through hole 14 that can be connected to a negative pressure generator, it is possible to generate vacuums individually in each part or in combination and thus promote aeration of one or both lungs.

Peripheral contour 18 of shell 11, when it is in position around the patient's dorsal part, comes to be hermetically adhered to the patient's skin, so as to create a hermetically sealed volume. In order to enable this hermetic connection, it is possible to attach a sealing gasket onto peripheral contour 18 of shell 11. In an embodiment, such as shown in FIG. 4, sealing gasket 20 comprises two contact lips 21, 22 of deformable material to ensure the tight seal of the connection between shell 11 and the dorsal part of the chest wall, during vacuum.

When shell 11 is depressurized, a vacuum is generated locally in the internal volume between hermetic shell 11 and the wall of the patient's thoracic cage via the tightness of the connection. This vacuum makes it possible to lower the pleural pressure and increase the transpulmonary pressure locally in order to promote aeration of the posterior part of one or both lungs opposite the shell.

The shell 11 is also provided with reinforcing grooves 2 extending longitudinally or transversely on said shell 11. In the example shown in FIGS. 2A and 2B, the longitudinal grooves extend between the two through openings 14. Thus, serosities can be drained by grooves 23 and aspirated by holes 14.

The invention claimed is:

1. A device for selective regionalization of pulmonary aeration resulting from the ventilation delivered by ventilatory support with an invasive or non-invasive artificial ventilation system, and/or naturally by the respiratory muscles, for a patient presenting with a respiratory pathology associated with inhomogeneous pulmonary lesions intended to be used with at least one negative pressure generator to generate a vacuum on the posterolateral part of the chest wall, said device comprising a rigid or semirigid shell, comprising:

a shape defining a volume intended to house and follow the contours of the dorsal part of the patient when the patient is lying on said shell, at least one through hole, intended to be connected to a negative pressure generator, a hermetic peripheral contour intended to be hermetically supported against the skin of the patient's dorsal part, an internal wall delimited by hermetic peripheral contour and forming a volume which houses the dorsal part of the patient's chest wall and wherein the vacuum is maintained, and a layer of honeycomb material lining the internal wall of said shell to follow the contours of the patient's body and which is intended to be in contact with the skin of the patient's dorsal part, the vacuum generated by the negative pressure generator hermetically houses the dorsal part in the device, making it possible to promote, by local increase of transpulmonary pressure, the aeration of the damaged regions of the lung or lungs in the posterolateral area and with the honeycomb material layer to more homogeneously redistribute the pulmonary aeration resulting from ventilation, and wherein the honeycomb material layer has a structure making it possible, when a vacuum is created in the shell, to homogeneously distribute the vacuum over the entire surface, the honeycomb material layer being an open porosity homogenization foam.

2. The device according to claim 1, characterized in that the layer of honeycomb material is made of polymer.

3. The device according to claim 2, characterized in that the polymer is selected from polyurethane, polyethylene or polyether.

4. The device according to claim 1, characterized in that shell has an elliptical shape exhibiting a concave curvature to follow the contour of the posterior part of the patient's chest wall.

5. The device according to claim 1, characterized in that the honeycomb material layer lines the entire internal shell and is delimited by the internal shell and the peripheral contour.

6. The device according to claim 1, characterized in that peripheral contour comprises sealing means extending over the contour of peripheral part of the shell, and intended to be tightly supported against the skin of the patient's dorsal part in the posterolateral region of the patient's chest wall.

7. The device according to claim 6, characterized in that the sealing means comprise a sealing gasket, said sealing gasket being advantageously provided with two sealing lips, intended to come into contact with the patient's skin, on either side of peripheral part of the shell.

8. The device according to claim 1, characterized in that the shell has several through holes located to homogeneously distribute the vacuum in the shell.

9. The device according to claim 1, characterized in that the shell is provided with at least one reinforcing groove, whose cross section relative to the central longitudinal axis which extends essentially along the spine of the patient housed in the shell, and defines a concavity at the internal wall and a convexity at the external wall of the shell.

10. The device according to claim 9, characterized in that a reinforcing groove emerges into a through hole of the shell.

11. The device according to claim 1, characterized in that the shell comprises a central support means, positioned transversely on internal wall of shell on either side of a central longitudinal axis that extends essentially along the spine of the patient housed in the shell, and intended to come into contact with the patient's body by extending longitudinally along the spine.

12. The device according to claim 11, characterized in that central support means is made of a sealed material and hermetically divides said shell into two lateral parts, thus being able to hermetically separate lateral parts of the shell positioned on either side of said central support means when the shell is held around the dorsal part of the patient's chest wall, foam lining each of the lateral parts from the peripheral contour to the central support means, each part of the shell being provided with at least one through hole able to be connected to a negative pressure generator, making it possible to generate individual vacuums in each part or in combination, and thus to promote aeration of the posterolateral part of one lung or both lungs.

13. The device according to claim 1, characterized in that shell extends longitudinally from the lower edge of the ribs to the axillary hollow, and transversely up to the midaxillary line.

14. A system for applying a localized transpulmonary pressure, said system comprising at least:

a device for selective regionalization of the distribution of pulmonary aeration in the posterolateral part of the lungs according to claim 1, and at least one negative pressure generator connected to the device by the through hole in the shell, so as to communicate a negative pressure from the generator to the shell and create a vacuum between the patient's posterior chest wall on which the device is applied and said shell.

15. The system according to claim 14, characterized in that the negative pressure generator is able to deliver constant or variable negative pressures.

16. A ventilatory support kit comprising:

a system for applying a localized transpulmonary pressure according to claim 14, and a system for invasive or non-invasive artificial ventilation.

17. The ventilatory support kit according to claim 16, wherein an invasive or non-invasive artificial ventilation system is connected with the negative pressure generator.

18. The ventilatory support kit according to claim 16, wherein the invasive or non-invasive artificial ventilation system is able to deliver constant or variable positive pressures.

* * * * *